United States Patent
Weller

[19]

[11] Patent Number: 6,045,059
[45] Date of Patent: Apr. 4, 2000

[54] NOZZLE FLUSH CAP

[75] Inventor: Chad Weller, Mission Viejo, Calif.

[73] Assignee: The Toro Company, Riverside, Calif.

[21] Appl. No.: 08/760,609

[22] Filed: Dec. 4, 1996

[51] Int. Cl.[7] .............................. B05B 15/02; B05B 15/10
[52] U.S. Cl. .......................... 239/203; 239/106; 239/506; 239/507
[58] Field of Search ..................................... 239/106, 107, 239/200, 201, 203, 204, 205, 288, 505, 506, 508, 509, 514, 507

[56] References Cited

U.S. PATENT DOCUMENTS

| | | | |
|---|---|---|---|
| 1,899,711 | 2/1933 | Munz | 239/204 |
| 1,964,269 | 6/1934 | Munz | 239/204 X |
| 2,975,981 | 3/1961 | Cockman | 239/507 X |
| 3,820,717 | 6/1974 | Pohle | 239/107 |
| 5,163,618 | 11/1992 | Cordua | 239/107 X |
| 5,232,156 | 8/1993 | Csordas et al. | 239/106 X |

Primary Examiner—Andres Kashnikow
Assistant Examiner—Robin O. Evans
Attorney, Agent, or Firm—Richard L. Myers

[57] ABSTRACT

A sprinkler having an output orifice through which water operatively flows, includes a flush cap adapted for movement relative to the output orifice from a free position wherein the cap is disengaged from the sprinkler, to a locked position wherein the cap is generally fixed to the sprinkler and substantially covers the output orifice. The flush cap in the free position is angularly displaced in a single plane from the flush cap in the locked position. A deflector, disposed at an obtuse angle to the axis of the cap, biases the cap to the locked position during a flushing operation. Pulling grip portions of a handle also biases the cap to the locked position. An associated method includes the step of tilting the flush cap in a single plane in order to engage the sprinkler in the lock position.

21 Claims, 1 Drawing Sheet

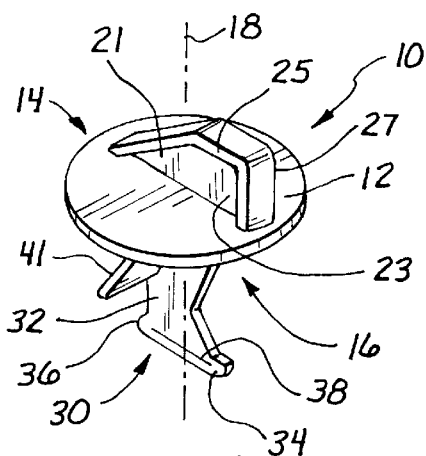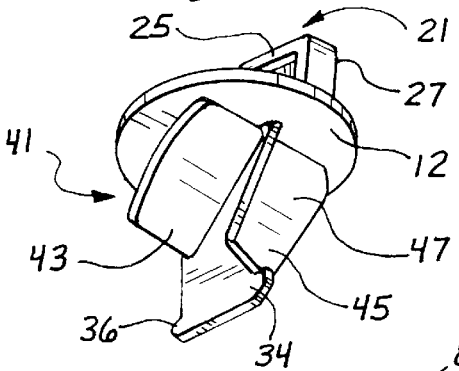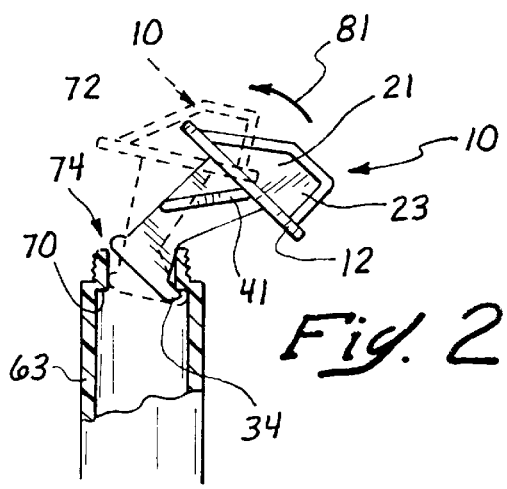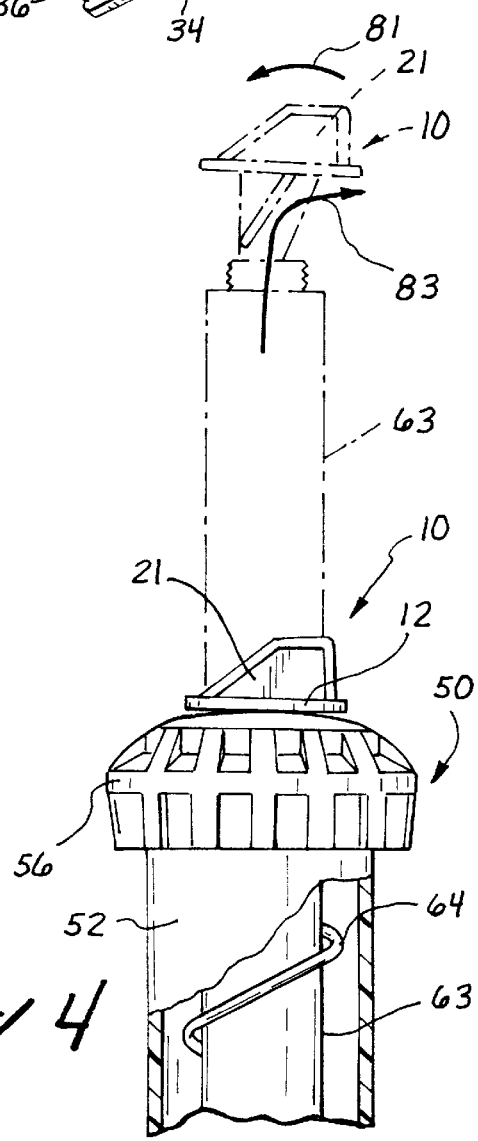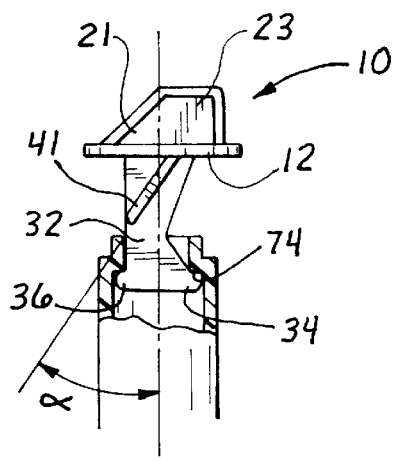

NOZZLE FLUSH CAP

BACKGROUND OF THE INVENTION

1. Field of the Invention

This invention relates generally to methods and apparatus for covering the output orifice of an irrigation sprinkler, and more specifically to a flush cap which also facilitates flushing the sprinkler during installation.

2. Description of the Prior Art

Underground sprinkler systems include a source of water, and a labyrinth of pipes which convey that water to sprinklers which extend above ground to distribute the water for irrigation. These sprinklers are commonly of the type which include a riser that is biased to a normal position below the surface of the ground, but which is adapted to resist the bias and rise to an elevated position above the ground when activated by water pressure. This riser has an output channel and an output orifice which is adapted to receive a nozzle at the end of the riser.

When underground sprinkler systems are installed, small trenches are dug to receive the pipes and sprinklers. After these elements are assembled, the trenches are back filled to bury the pipe and a major portion of each sprinkle. During this installation procedure, the sprinklers are susceptible to damage from rocks and other debris. For this reason, the sprinkler nozzle, which is perhaps the most fragile part of the sprinkler, is not attached until after the back fill process is completed. In the absence of the nozzle, if the output orifice were left open, the backfilled dirt and debris would enter the sprinkler. To avoid this consequence, removable caps have been provided to cover the output orifice during the backfill operation.

Even with the protective covers, it has been found that dirt can enter the system at any point where pipes or sprinklers are connected during the assembly process. In order to clear the system of all such dirt and debris, it has been customary to flush the system with water prior to the installation of the nozzles. The covers have been removed during this process in order to open the output orifice. When the flushing process is completed, sometimes the dirt re-enters the orifice from the surrounding flush pool thereby contaminating the system before the nozzles can be installed.

Special covers in the form of flush caps have been used in order to facilitate the flush operation without removing the cover. These flush caps have commonly been screwed into the nozzle threads at the output orifice. In many cases the screw threads have not provided a sufficiently positive lock to withstand the water pressures. In other cases, the threaded flush caps have been difficult to remove against the bias of the sprinkler riser.

SUMMARY OF THE INVENTION

In accordance with the present invention, a sprinkler flush cap is proved which is easily mounted into a position that provides a positive lock with the riser of the sprinkler. The flush cap is tilted into this position with movement in only a single plane. In spite of the simplicity of this mounting step, a positive lock with the riser is formed. As long as the flush cap remains tilted or torqued into this position, it maintains its locked relationship with the riser.

The torque maintaining the lock is automatically provided in two important operations which involve the flush cap. In the flushing operation, an angled deflection surface is provided which receives the water through the output channel of the sprinkler at an obtuse angle. The pressure of water on this surface automatically torques the flush cap to maintain the locked relationship with the sprinkler.

In a second operation which involves the flush cap, gripping portions of the cap are engaged to pull the flush cap and riser axially against the bias on the riser. With the gripping portions of the handle offset from the axis of the flush cap, torque is automatically developed in a direction which biases the flush cap to the locked position. Thus, during these operations the flush cap is automatically maintained in the fixed, locked position with the sprinkler.

In spite of the positive lock which is maintained in the locked position, the flush cap is easily removed by grasping the riser, and tilting the flush cap in an arch disposed in a single plane, until the flush cap disengages the sprinkler.

In one aspect of the invention, the flush cap includes a cover having a central axis, a first side facing in a first direction along the axis, and a second side facing in a second direction along the axis. A handle having a fixed relationship with the cover extends axially on a first side of the corner. An extension member having a fixed relationship with the cover extends axially on a second side of the cover. The extension member includes at least one projection extending radially of the axis in a particular direction. Grasping portions of the handle are displaced from the axis in the particular direction and are disposed in a plane including the axis.

Another aspect of the invention includes the combination of a sprinkler and flush cap. The sprinkler has an output orifice through which water flows when the sprinkler is operatively disposed to distribute the water for irrigation. The flush cap is adapted for movement relative to the output orifice of the sprinkler from a free position wherein the cap is disengaged from the sprinkler to a locked position wherein the flush cap is generally fixed to the sprinkler. The flush cap in the free position is angularly displaced in a single plane from the flush cap in the locked position.

In a further aspect of the invention the sprinkler has an output channel with an axis and an output orifice. This sprinkler is adapted to receive water into the channel and to expel the water through the output orifice during a flushing operation. A deflector having an angled deflection surface is included in the flush cap and mounted in the output channel of the sprinkler when the flush cap is in the locked position. This deflection surface has an obtuse angle relative to the axis of the output channel so that water passing through the channel during the flushing operation impinges on the deflection surface to produce a torque on the flush cap which biases the cap away from the free position and toward the lock position.

In still a further aspect of the invention, the grip portions of the handle are disposed off-axis, so that pulling on the grip portions along the axis when the flush cap is in the locked position, biases the flush cap away from the free position.

Also included in the invention is a method for operating a flush cap relative to a sprinkler. This method includes the step of providing the sprinkler with an output channel, an output orifice, and a retention lip disposed in the channel and facing away from the orifice. The flush cap can be provided with a cover having an axis and an extension member extending generally axially from the cover. First and second projections on the extension member extend radially of the axis. The extension member of the flush cap is inserted into the output orifice and the retention lip engaged by the first projection. The flush cap is then tilted in a single plane to engage the retention lip with the second projection in order to mount the flush cap on the sprinkler.

These and other features and advantages of the invention will become apparent with a description of preferred embodiments and reference to the associated drawings.

DESCRIPTION OF THE DRAWINGS

FIG. 1A is a top perspective view of a preferred embodiment of the flush cap of the present invention;

FIG. 1B is a bottom perspective view of the flush cap illustrated in FIG. 1A;

FIG. 2 is an axial cross section view of the flush cap disposed in a free position relative to the riser of the sprinkler;

FIG. 3 is an axial cross section view similar to FIG. 2 and illustrating the flush cap in a locked position; and FIG. 4 is a side elevation view of the sprinkler and flush cap during a flushing operation.

DESCRIPTION OF PREFERRED EMBODIMENTS AND BEST MODE OF THE INVENTION

A sprinkler flush cap is illustrated in the perspective view of FIG. 1 and designated generally by the reference numeral 10. The cap 10 includes a cover 12 having a first side 14, a second side 16, and an axis 18 extending therebetween. In this particular embodiment, the cover 12 has a generally planar configuration and is in the shape of a circular disc. The disc or cover 12 has a generally planar configuration and extends generally perpendicular to the axis 18.

A handle 21 extends from the first side 14 of the cover 12 and has a generally planar configuration facilitating gripping between the thumb and first finger of a users hand. The plane of the handle 21 includes the axis 18, so the handle 21 is also generally perpendicular to the cover 12.

Gripping portions of the handle 21 are designated by the reference numeral 23. These portions 23 can be narrowed, serrated or otherwise configured to facilitate gripping the handle 21. In this particular embodiment, the gripping portions 23 are provided with perimeter ridges 25 and 27 which extend along the outermost edges of the handle 21.

Importantly, the griping portions 23 of the handle 21 are generally offset from the axis 18. With this axial offset, a person gripping the portions 23 and pulling those portions in the direction of axis 18, will torque the flush cap 10 in the opposite direction away from the gripping portions 23. The importance of this feature will be discussed in greater detail below.

The flush cap 10 also includes an extension member 30 which extends from the second side 16 of the cover 12 also along the axis 18 but in a direction opposite to that of the handle 21. In this particular embodiment, the extension member 30 is in the form of a blade having a generally planar configuration. In this case the blade 32 is formed in the same plane as the handle 21.

An important part of the present invention is associated with a projection 34 which extends from the blade 32 generally radially of the axis 18. In a preferred embodiment, the projection 34 is the only projection provided on the blade 32. However, in the illustrated embodiment a second projection 36 is provided on the opposite side of the blade 32. An imaginary line 38 drawn between the two projections 34 and 36 is disposed in the plane of the blade 32 and handle 21, and is generally parallel to the plane of the disc or cover 12. In this embodiment, the axis 18 passes equidistant from projections 34 and 36.

A deflector 41 can be formed integral with the cover 12 and blade 32. This deflector 41, which in the illustrated embodiment is formed as two generally rectangular sections 43, 45 defines a deflection surface 47 which in a side elevation view, such as that of FIG. 3, has an acute angle alpha with respect to the axis 18. This obtuse angle alpha is of particular interest to the present invention when the flush cap is operatively disposed on a sprinkler during the flushing operation. This operation will be discussed in greater detail below.

The flush cap 10 is adapted to be operatively disposed relative to a sprinkler, such as that designated by the reference numeral 50 in FIG. 4. This particular sprinkler 50 includes a housing 52 and a top 56 which can be screwed to the housing 52. A riser 63 is provided for axial movement within the housing 52 between an extended position, such as that illustrated by the dotted line in FIG. 4, and a normally stored position such as that illustrated by the solid lines in FIG. 4. The riser 63 is biased to this normally stored position by a spring 64.

Referring more specifically to the cross section view of FIG. 2, it will be noted that the riser 63 includes an output channel 70 which leads to an output orifice 72. Within the channel 70, an annular retention lip 74 is formed which faces away from the orifice 72.

When the flush cap 10 is initially mounted on the sprinkler 50, the riser 63 should be elevated against the bias of the spring 64 so that the output orifice 72 is exposed as illustrated in FIG. 4. Then, with the user grasping the handle 21, the blade 32 of the extension member can be inserted through the output orifice 72.

Initially, the flush cap 10 is in a free position, such as that illustrated in FIG. 2, where the cap 10 is substantially disengaged from the sprinkler 50. In this free position, the projection 34 of the extension member 32 engages the retention lip 74 within the output channel 70. From this position, the flush cap 10 can be rotated or tilted in a single plane, as illustrated by an arrow 81. This rotation causes the flush cap 10 to pivot at the projection 34 until the second projection 36 clears the annular lip as illustrated in FIG. 3. This clearance of the second projection can be provided with an interference fit so that the projection 36 functions as a detente and the flush cap 10 snaps into its locked position. As noted, an alternative embodiment of the flush cap 10 may not include the second projection 36. Nevertheless this embodiment provides a positive lock between the flush cap 10 and sprinkler 50.

With further reference to FIG. 3, it will be noted that the cover 12 of the flush cap 10 covers the sprinkler 50 when the cap 10 is operably disposed. With this full coverage, the flush cap 10 inhibits the return of pooled flush water to the sprinkler 50 after a flush operation.

In the locked position illustrated in FIG. 3, the flush cap 10 facilitates two operations of the sprinkler 50. In a first operation illustrated in FIG. 4, the sprinkler 50 is flushed with water to remove all debris and dirt from the system In a second operation, the flush cap 10 is pulled axially against the bias of the spring 64 to an elevated position, such as that illustrated in FIG. 4, where the cap 10 can be removed and a nozzle (not shown) installed.

During the flush operation, water is forced through the sprinkler 50 and the output channel 70 of the riser 63. The water pressure associated with this flushing operation initially operates to force the riser to an extended position, as illustrated in FIG. 4, so that any dirt and debris within the system can be expelled through the output orifice 72.

It is of particular importance that during the flushing operation the water pressure not expel the flush cap 10. This unfavorable result is avoided in the illustrated embodiment which includes the deflector 41. As water passes through the output channel 70 during the flushing operation, it impinges on the deflection surface 47 and produces a force on the deflector 41 which tends to pivot or tilt the flush cap 10 in the direction of the arrow 81. A force created by water flow directed along the arrow 83 produces a torque such that the flush cap 10 tends to pivot on the projection 34 generally in the direction of the arrow 81. Thus, the water pressure tends to bias the flush cap 10 away from the free position illustrated in FIG. 2 and toward the locked position illustrated in FIG. 3. With the flush cap 10 locked to the riser 63, it cannot be expelled from the sprinkler 50 during the flushing operation.

In order to remove the flush cap 10 from the sprinkler 50 in the second operation, the handle 24 is preferably gripped between the finger and thumb of the user's hand. Typically the user will engage the gripping portions 23 which are provided at a position displaced from the axis 18 as previously discussed. Gripping these portions 23 and pulling the flush cap 10 along the axis 18 also produces a torque. If the gripping portions 23 are displaced from the axis 18 a distance greater than the projection 34, the flush cap 10 will torque in the direction of the arrow 81. This tendency will cause the flush cap 10 to be biased away from the free position illustrated in FIG. 2 and toward the locked position illustrated in FIG. 3. Thus the flush cap 10 will remain locked to the riser 63 as the riser is pulled axially from the sprinkler 50.

When the riser 63 is sufficiently elevated, it can be gripped and held in the extended position. With the flush cap 10 thus exposed, it can now be easily rotated in a single plane and in an arc to free the retention lip 74. While still holding the riser in the extended position, a nozzle (not shown) can be screwed or otherwise fixed in the output orifice 72 of the riser 63.

A further advantage associated with the flush cap 10 relates to its manufacturability with the simplicity of construction illustrated and described above, it is apparent that this flush cap 10 can be made using a straight pull mold. This will greatly decrease the complexity ad cost of manufacturing the flush cap 10.

In an associated method of operation, the flush cap is initially mounted to the sprinkler by inserting the extension member 30 into the output orifice 72. Then the flush cap 10 can be moved until the projection 34 engages the retention lip 74 of the riser 63. Then by tilting the flush cap in a single plane, for example the plane of the blade 32, the projection 36 can function as a detente to provide a snap fit into the locked position. In this position, both projections 34 and 36 are seated on the side of the lip 74 opposite the output orifice. Any tendency to further tilt the flush cap 10, for example by water pressure during a flushing operation, or by axially pulling the off-axis gripping portions 23 tends to further bias the flush cap to the locked position.

There are many variations on this concept all within the scope of the invention. For example, the extension member 30 may have a configuration other than that of the blade 32. The blade configuration is preferred however, since it maximizes the open area of the output channel 70 to facilitate the flushing operation. The deflector 41 can also be provided in different forms although the orientation of the deflection surface 47 is particularly desirable as it facilitates maintenance of the locked position between the flush cap 10 and riser 63. Certainly the configuration of the handle 21 can be changed although the off-axis orientation of the gripping portions 23 is preferred to bias the flush cap 10 to the locked position during axial movement.

Although the invention has been described with reference to specific embodiments and method steps, it will be clear that the invention can be otherwise embodied and carried out. For this reason, one is urged not to limit the concept to the disclosed embodiments, but rather, encouraged to determine the scope of the invention with reference to the following claims.

What is claimed is:

1. A combination, including:
    a sprinkler having an output orifice through which water flows when the sprinkler is operatively disposed to distribute the water for irrigation;
    a flush cap adapted for movement relative to the output orifice of the sprinkler from a free position wherein the cap is disengaged from the sprinkler to a locked position wherein the flush cap is generally fixed to the sprinkler and substantially covers the output orifice of the sprinkler; and
    the flush cap in the free position being angularly displaced in a single plane from the flush cap in the locked position.

2. A combination reciting claim 1, when the flush cap has an axis and further comprises:
    an extension member having at least one projection extending radially of the axis to engage the sprinkler in the locked position.

3. The combination recited in claim 2, wherein the flush cap further comprises:
    a handle extending in a direction generally opposite to the extension member; and
    grip portions of the handle radially displaced from the axis in a plane which includes the axis and the at least one projection.

4. The combination recited in claim 3, wherein the flush cap comprises a deflector defining a deflection surface disposed at an obtuse angle to the axis of the flush cap.

5. The combination recited in claim 4, wherein the plane is a first plane and the deflection surface forms a second plane substantially perpendicular to the first plane.

6. A combination, including:
    a sprinkler having an output channel with an axis and an output orifice, the sprinkler being adapted to receive water into the output channel and expel the water through the output orifice during a flushing operation;
    a flush cap adapted for movement relative to the output orifice of the sprinkler from a first position wherein the cap is disengaged from the sprinkler to a locked position wherein the cap is generally fixed to the sprinkler and substantially covers the output orifice of the sprinkler;
    a deflector included in the flush cap and defining a deflection surface having an angle relative to the axis of the output channel such that water passing through the output channel along the axis during the flushing operation impinges on the deflection surface to produce a torque on the flush cap which biases the flush cap toward the locked position.

7. The combination recited in claim 6, wherein the axis of the sprinkler is a first axis and the flush cap includes a second axis, the combination further comprising:
    an extension member included in the flush cap and extending along the second axis; and
    at least one projection extending radially of the second axis to engage the sprinkler in the output channel of the sprinkler when the flush cap is in the locked position.

8. The combination recited in claim 7, further comprising:

portions of the sprinkler defining a retention lip in the output channel; and at least one of the projections forms an interference fit with the retention lip when the flush cap is in the locked position.

9. The combination recited in claim 8, further comprising:

a handle included in the flush cap and extending along the second axis of the flush cap in a direction opposite to the extension member; and gripping portions of the handle disposed radially of the second axis of the flush cap.

10. The combination recited in claim 9, wherein:

the gripping portions of the handle, the second axis of the flush cap, and at least one projection of the extension member are disposed in a common plane.

11. The combination recited in claim 10, wherein the deflection surface of the flush cap forms a second plane generally perpendicular to the common plane.

12. A combination, including:

a sprinkler having an output orifice through which water flows when the sprinkler is operatively disposed to distribute the water for irrigation;

a flush cap adapted for movement relative to the output orifice of the sprinkler from a free position wherein the cap is disengaged from the sprinkler to a locked position wherein the cap is generally fixed to the sprinkler;

a cover included in the flush cap and having a first side and a second side with an axis extending therebetween;

a handle included in the flush cap and extending on the first side of the cover away from the sprinkler when the flush cap is in the locked position;

an extension member extending on the second side of the cover into the sprinkler to releasably engage the sprinkler in the locked position;

grip portions of the handle facilitating gripping of the handle by a user; and the grip portions being disposed off-axis in a particular direction so that the pulling of the cap along the axis when the flush cap is in the locked position biases the flush cap away from the free position.

13. The combination recited in claim 12, further comprising:

at least one projection included in the extension member and extending outwardly in the particular direction.

14. The combination recited in claim 13, further comprising:

a deflector having a deflection surface with a generally planar configuration, the deflector being adapted for deflecting the water from the sprinkler when the water is being distributed for flushing.

15. A method for operating a flush cap relative to a sprinkler, comprising the steps of:

providing the sprinkler with an output channel, an output orifice, and a retention lip disposed in the channel and facing away from the orifice;

providing the flush cap with a cover having an axis, an extension member extending generally axially from the cover, and at least one projection included in the extension member and extending radially of the axis;

inserting the extension member of the flush cap into the output orifice;

engaging the retention lip with the at least one projection of the flush cap; and tilting the flush cap in a single plane in order to engage the sprinkler in the locked position.

16. The method recited in claim 15, further comprising the steps of:

providing the flush cap with a handle and gripping portions of the handle displaced radially of the axis of the cover;

gripping the gripping portions of the handle;

pulling the gripping portions of the handle axially to bias the flush cap to the locked position.

17. The method recited in claim 16, further comprising the steps of:

forcing water through the output channel of the sprinkler to flush the sprinkler;

deflecting the water in the output channel laterally of the sprinkler; and during the deflecting step, biasing the flush cap to the locked position.

18. A flush cap, comprising:

a cover having a central axis;

a handle having a fixed relationship with the cover and extending axially of the cover in a first direction;

an extension member having a relatively fixed relationship with the cover and extending axially of the cover in a second direction opposite to the first direction;

the extension member including at lest one projection extending radially of axis in a particular direction; and gripping portions of the handle disposed in the plane of the axis, and displaced form the axis in the particular direction.

19. The flush cap recited in claim 18, further comprising:

a disc included in the cover and having the general configuration of a first plane disposed generally perpendicular to the central axis;

a blade disposed generally in a second plane generally perpendicular to the first plane;

a pair of the projections extending in opposite directions radially outwardly of the blade in the second plane.

20. The flush cap recited in claim 19, further comprising;

gripping portions of the handle disposed generally in the second plane at a position removed from the central axis of the cover.

21. The flush cap recited in claim 20, further comprising:

a deflector disposed along the blade and having a deflection surface in a third plane having an obtuse angular relationship with the axis.

* * * * *